E. H. ANGIER.
PACKAGE.
APPLICATION FILED MAY 14, 1918.
1,282,167.
Patented Oct. 22, 1918.
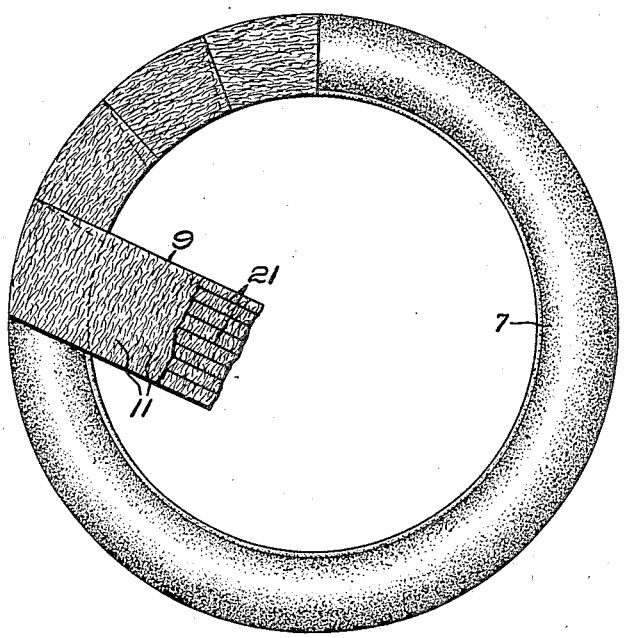
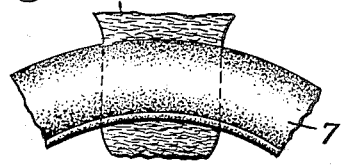
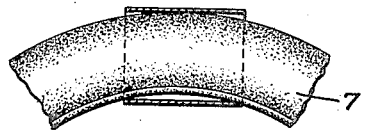
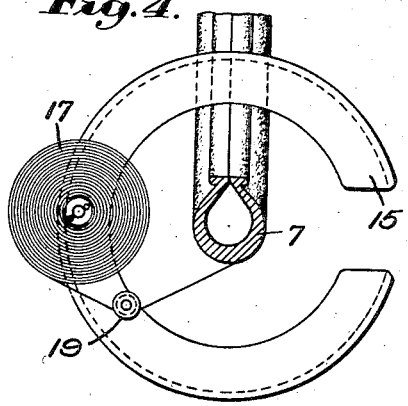
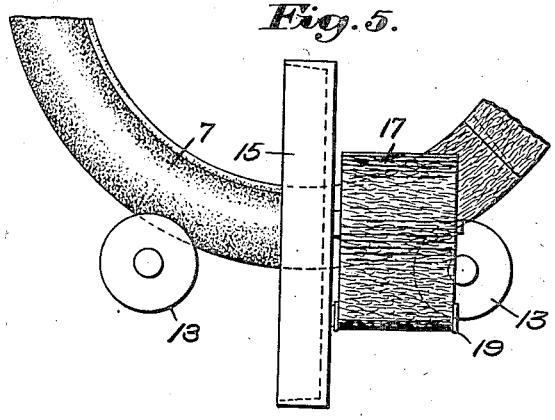
Inventor:
Edward H. Angier
by Emery, Booth, Janney & Varney
Attys

UNITED STATES PATENT OFFICE.

EDWARD H. ANGIER, OF FRAMINGHAM, MASSACHUSETTS.

PACKAGE 1,282,167.    Specification of Letters Patent.    Patented Oct. 22, 1918.

Application filed May 14, 1918. Serial No. 234,461.

*To all whom it may concern:*

Be it known that I, EDWARD H. ANGIER, a citizen of the United States, and resident of Framingham, in the county of Middlesex and State of Massachusetts, have invented an Improvement in Packages, of which the following description, in connection with the accompanying drawings, is a specification, like characters on the drawings representing like parts.

This invention relates to packages and the purpose is to provide an article with a closely fitting and resistant inclosing covering. My invention is more particularly designed for packaging as units for storage or shipment those articles which are subject to marked distorting flexure under the shocks of handling. I also design to provide a smooth and close covering for articles having a longer outer dimension and a shorter inner dimension. Such articles may be referred to as toric, that word referring to a solid which may be considered as produced by the revolution of a figure about an axis exterior thereto. Examples of such articles are coils of wire and the shoes of vehicle tires in which case the revolution is a complete one and the article is annular.

My invention will best be understood by the following description of an embodiment thereof taken in connection with the accompanying drawing wherein:—

Figure 1 is a side view of a pneumatic vehicle tire partially inclosed in a wrapping;

Figs. 2 and 3 are diagrams to be referred to; and

Figs. 4 and 5 are front and side elevations respectively of the essential parts of a wrapping machine for annular articles.

As I anticipate a major field of usefulness for my invention in packaging the shoes of pneumatic vehicle tires and have illustrated such a shoe or tire in the drawing, I shall for convenience in the following description refer specifically to a tire as the article inclosed. Tires, moreover, present a more difficult problem than other annular articles. In common with others they are subject to a distorting flexure in handling when they pass under a shock from the truly circular form to a more or less elliptical form. Moreover, because of its bowed or horseshoe-shaped section the cross section of the tire will alter markedly, the beads or rim-engaging parts of the tire spreading and putting a disrupting strain on the inclosing covering.

In accordance with my invention I inclose the tire 7 in a comparatively narrow strip 9 of wrapping material encircling the same in a plurality of helical turns. The strip 9, however, is of peculiar structure in order that it may closely conform to the tire and resist the shocks of use. Before application the strip is provided with substantially transverse gatherings 11 which may be and preferably are more or less irregular, in the nature of crapings, these gatherings providing resilient embossments throughout the surface of the strip. The showing of these gatherings in the drawing is exaggerated and somewhat diagrammatic. One manner of forming suitable crapings is to run the strip while wet over a roll. The strip 9 is therefore expansible independently of any elasticity of the material, the expansion being due to opening or flattening of the gatherings. My invention contemplates the use of a narrow strip in which the degree of the gatherings is so proportioned to the width of the strip that the strip may be distorted sidewise under indirect tension, so that one edge or, in fact, any longitudinal zone thereof may be elongated independently of the rest of the strip.

Referring to Fig. 3, I have there illustrated diagrammatically a flat strip as applied to a tire and it will be seen that at the outer circumference of the tire the center of the strip may be drawn taut but the edges will be spaced away therefrom, the strip being substantially tangent to the circumference. On the other hand, at the inner circumference the edges of the strip will be in contact with the tire and the middle portion spaced away, the strip occupying substantially the position of a chord. For these reasons it has been hitherto impossible to get a closely fitting wrapping unless exceedingly narrow strip is used, in which case the extent of these discrepancies is minimized. It will be noted that the conditions at the tread of the tire are exactly opposite to those at the beads and the conditions vary between these two from point to point around the cross section of the tire.

In utilizing a wrapping strip, as shown in

Fig. 1 and herein described, the resiliently expansible crapings permit differential expansion of the parts of the strip whereby it may conform locally to the article inclosed. In Fig. 2 I have attempted to illustrate this diagrammatically in contrast to Fig. 3. At the tread of the tire the crapings along the center of the strip will be longer than the edges and it can take a bowed form fitting the outer circumference of the tire. At the inner circumference, on the contrary, the edges will be expanded, the center remaining contracted, and thus the strip can fit the concave inner circumference. I have not attempted to illustrate in Fig. 1 differential expansion of the gatherings, considering it impractical.

By constructing the package as herein described, not only is a close fit obtained but it is possible to use a comparatively wide strip so that the tire will be covered in a smaller number of turns. This results not only in greater speed in applying the covering but in an economy of material since in the customary method of packaging there is an overlap between adjacent turns.

When the wrapping is applied as described, the crapings are somewhat opened out or flattened, in other words are stretched against their natural resiliency, but, at least considered as a whole, the strip does not reach its ultimate limit of expansion. The material is tensioned about the tire and because of the local expansion of individual gatherings this tension is applied throughout the width of the strip to draw the covering smoothly into contact with the tire. When the article is deformed or distorted in use, as for example by flattening from the circular form shown in Fig. 1 to a more or less elliptical form, the curvature will be diminished at one part of the circumference and increased at the other. Also, in the case of a tire the tire will tend to flatten cross-sectionally and the beads to spread at the inner circumference. Referring to Fig. 3, it will be understood that if the curvature of the tire changes the tension at various points transversely of the wrapping strip changes, and in tire packages as hitherto constructed a strong breaking strain has been applied to the covering. In my present package, however, the crapings permit the strip to contract and to give locally in accordance with the distortion of the article and to follow the same resiliently in its movement. I have found by experiment that by pressing down on the top of a wrapped tire and at the same time standing on the beads of the lower circumference, it is possible to break the covering adjacent the beads when ordinary strip is used, although the paper be of very high quality. When prepared with gathered strip as herein disclosed, even although the stock is of less strength the package will withstand such treatment and when the tire resumes its shape will be apparently as strong as before and as tightly and smoothly applied. In fact one can actually jump up and down on the bead side without causing breakage.

I have found that on standing the wrapping of the packaged tire appears to contract and draw about the tire even more smoothly and tightly than when first applied.

Helical wrappings as hitherto constructed have often been torn because of the engagement, as the tire was rolled about, of some object with an overlying edge of the strip which probably did not lie tight. The tear would start at this edge transversely of the strip. Not only is a gathered strip more difficult to tear across, but the edge is yielding and not so easily broken to start the tear. In fact, if for some reason an edge is loose and is pushed against, instead of breaking it will roll up and form a sort of bead which effectually resists further tearing strain.

Difficulties of manufacture are also avoided by my invention. Referring to Figs. 4 and 5, I have there illustrated diagrammatically the essential parts of a machine of known type for use in wrapping an annular article with helical turns of strip. The tire 7 is supported on rolls 13 which are driven to feed the tire and around the cross-section of the tire is rotated a shuttle 15 carrying a roll 17 of strip which is led to the tire over a guide 19. The rotation of the shuttle provides for winding the strip around the cross-section of the tire while the movement of the tire through the shuttle by the rolls 13 provides the pitch of the helix. In utilizing such a machine much difficulty has been found due to breakage of the paper as it is drawn from the roll 17. Referring to Fig. 5, it will be noted that the strain on the strip as it is drawn to the tire is not direct but oblique and that this will vary with the relative position of tire and shuttle and with the size of the tire. Furthermore, referring to Fig. 4, since the path of the guide as the shuttle rotates is not the involute of the tire surface, the tension on the strip is constantly varied. It has been found in practice that much difficulty is encountered due to breakage of the wrapping strip and while I have by proper means minimized this breakage in practice, it involves careful and inconvenient adjustments. It will be apparent that the yieldably expansible strip 9, as described, and particularly one which can distort under oblique tension, will in itself take up and neutralize the indirect strains and varying tension which have been such a fruitful cause of difficulty in wrapping with plain strip. Another source of breakage has been abrupt starting of the shuttle when the operative threw in the clutch. I have found that the gathered strip will resist this shock and not snap.

I prefer to utilize in making my package the form of strip illustrated in Fig. 1, consisting of two thicknesses of gathered or craped paper connected by a layer of suitable lentous adhesive such, for example, as mineral pitch, in which are embedded longitudinal reinforcing strands 21. Preferably, also, I seal together the various turns of the wrapping and since the material is waterproofed by the layer of adhesive, a waterproof package is thus provided. As a sealed package my invention has particular advantages since the edges of the turns will lie in close contact without any fullnesses which would provide channels difficult to seal and which might permit moisture to enter the package. The yielding nature of the paper layers is such that they may give and follow any stretching of the reinforcing strands and thus the ultimate tensile strength of these strands may be utilized. The use of an adhesive which is somewhat lentous in character, that is, which is to a degree viscid and having a certain amount of slow give or movement, facilitates the adaptation of the two layers of paper and the reinforcing strands to one another when the whole is wrapped about an article.

While I have here shown a single tire as the article wrapped, it will be understood that a number of articles might be combined in a single package, although I have for convenience used the word article only in the singular.

Having thus described in detail the particular embodiment of my invention, the principles exemplified thereby which I claim as new and desire to secure by Letters Patent I shall express in the following claims:—

1. A package comprising a distortable toric article and a wrapping inclosing the same comprising a strip encircling the article in a series of closely drawn, helical turns, said turns having differentially expanded, substantially transverse gatherings and conforming throughout its width to the inclosed article.

2. A package comprising a distortable annular article of bowed section as, for example, a tire shoe and a wrapping inclosing the same comprising a strip encircling the article in a series of closely drawn, helical turns, said turns having differentially expanded, substantially transverse gatherings and conforming throughout its width to the inclosed article.

3. A package comprising an annular article and a wrapping inclosing the same comprising a strip encircling the article in a series of closely drawn helical turns, each turn embodying stretched resilient embossments tensioning the material throughout its width.

4. As a unit for shipment or storage, a package comprising a three dimensional article subject to marked distorting flexure under the shocks of handling and a covering therefor comprising closely drawn turns of strip forming a helix the axis of which is subject to flexure in the same way as the article, said turns comprising partially expanded, resilient gatherings.

In testimony whereof, I have signed my name to this specification.

EDWARD H. ANGIER.